May 28, 1963  A. R. PITT  3,091,418
AIRCRAFT ALIGHTING GEAR
Filed April 24, 1961
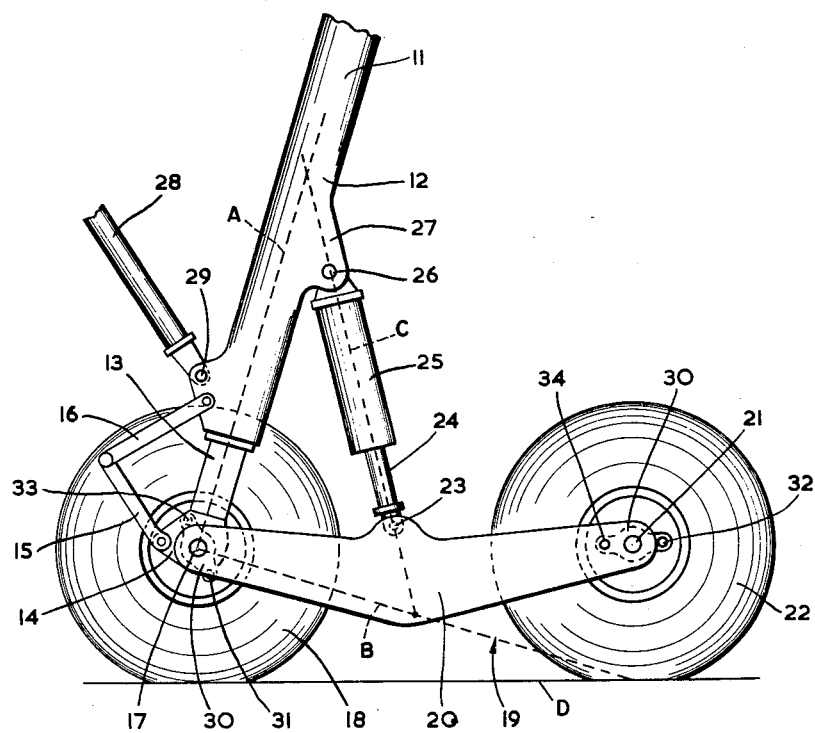
INVENTOR
Angus R. Pitt
By
Reynolds & Christensen
ATTORNEYS United States Patent Office 3,091,418
Patented May 28, 1963

3,091,418
AIRCRAFT ALIGHTING GEAR
Angus R. Pitt, Cheltenham, England, assignor to Dowty Rotol Limited, Cheltenham, England, a British company
Filed Apr. 24, 1961, Ser. No. 105,090
Claims priority, application Great Britain Apr. 26, 1960
4 Claims. (Cl. 244—103)

This invention relates to aircraft alighting gear.

One well-known form of aircraft alighting gear has a bogie carried by an aircraft supporting leg, the bogie including a bogie beam or bogie frame with two or more landing wheels mounted on axles disposed one behind the other. The wheels are normally fitted with brakes, for example of the disc-type, in order to bring an aircraft, to which the alighting gear is fitted, to a standstill when it is moving along the ground.

Such an aircraft alighting gear suffers from the disadvantage that, when the aircraft is moving along the ground and the brakes are applied, the rear of the bogie tends to lift, with the result that the brakes of the rear wheels cannot be used as effectively as the brakes of the front wheels.

In order to reduce the tendency of the rear of the bogie to lift during braking, it has been the practice hitherto to employ so called "brack-torque-reaction-linkages" connected between a torque-resisting element of each wheel brake and the aircraft supporting leg. Such brake-torque-reaction-linkages, however, add to the complexity of and to the weight of the alighting gear.

When a tyre is loaded, it deflects so that a considerable area of the tyre is in contact with the ground. The centre of area of this ground-contacting portion is herein referred to as the "effective ground contact point" of the tyre.

According to the invention, an aircraft alighting gear includes a bogie, a two-part freely-telescopic leg, one part of which is arranged for connection to an aircraft, the connection being a rigid connection when the alighting gear is extended with respect to the aircraft, the other part of the freely-telescopic leg being pivotally connected at or near its end portion remote from the said one part to the forward portion of the bogie, and a strut pivotally-connected at one end portion to the bogie and at its other end portion either to the said one part of the freely-telescopic leg or to the aircraft, the torque-resisting element or elements for the brake or brakes of the front wheel or wheels of the bogie being attached to the said other part of the freely-telescopic leg, and the torque-resisting element or elements for the brake or brakes of the rear wheel or wheels of the bogie being attached to the bogie, in which alighting gear the attachment point of the said other part to the bogie lies on a line which passes through a point lying on the rotational axis of the front wheel or wheels and also through the effective ground contact point of the tyres of the rear wheel or a line joining the effective ground contact points of the tyres of the rear wheels, the axis of the freely-telescopic leg lying at angle of between substantially 85 degrees and substantially 95 degrees to this line, and in which alighting gear the axis of the strut intersects this line substantially at its mid-point.

By so constructing the alighting gear, the wheels of the bogie are substantially equally loaded whether the aircraft to which the alighting gear is fitted is stationary, or whether the aircraft is moving along the ground with the wheel brakes applied.

An aircraft alighting gear in accordance with one embodiment of the invention will now be particularly described, by way of example, with reference to the accompanying diagrammatic drawing which shows a side elevation of part of the aircraft alighting gear.

Referring to the drawing, the aircraft alighting gear includes a leg 11 which is pivotally-connected at a point (not shown) to the structure of the associated aircraft, so that it may be moved about the pivotal connection from an extended position with respect to the aircraft (as shown in the drawing), to a stowed or retracted position within a part of the aircraft. The leg 11 comprises an upper part 12 which receives a lower part 13 in a telescopic manner, thereby to form a freely-telescopic leg. The lower end portion 14 of the lower part 13 of the leg is connected in conventional manner by means of scissors links 15 and 16 with the lower portion of the upper part 12 of the leg. The lower end portion 14 has a pivotal connection with an axle 17 for a front pair of wheels (one of which wheels is shown at 18) of a bogie generally indicated at 19. The axle 17 is mounted on the beam 20 of the bogie and thus the lower end portion 14 is pivotally connected with respect to the bogie beam. The rearward end portion of the bogie beam 20 is provided with an axle 21 which carries a pair of rear wheels of the bogie, one such wheel being shown at 22. At a point 23 intermediate the ends of the bogie beam 20 there is provided a pivotal connection for the piston rod 24 of a resilient telescopic strut or damper 25. The cylinder of the resilient telescopic strut 25 is pivotally connected at 26 to a pair of lugs 27 formed integrally with the upper part 12 of the leg 11.

The alighting gear may be locked in its extended position, so that its leg 11 remains at a constant angle to the ground, by means of a bracing strut 28 which is pivotally connected at one end to the upper part 12 of the leg 11 at 29, and at the other end to the aircraft.

Each of the front wheels 18 and each of the rear wheels 22 of the bogie 19 is provided with a disc-type brake. Such brakes are conventional and are not shown in detail. The four torque-resisting elements 30 for the disc-type brakes, two of which are shown in the drawing, are suitably mounted upon the axles 17 and 21 and include carrying means 31 and 32 respectively for the brake pad assemblies (not shown) of the disc-brakes. Each torque-resisting element 30 of the front wheel brakes is attached to the lower portion 14 of the lower part 13 of the leg 11 by securing means 33. Thus, during braking of the front wheels 18 the brake torque is applied to the leg 11.

Each torque-resisting element 30 of the rear wheels of the bogie is attached to the bogie beam 20 by securing means 34. Thus, during braking, the brake torque of the rear wheels is applied to the bogie beam 20.

The geometrical arrangement of the parts forming the alighting gear is such that when the alighting gear is in contact with the ground supporting an aircraft (a) the axis A of the leg 11 is inclined so that the angle formed between this axis A and a line B which not only passes through a point on the axis of the front wheel axle 17 but also passes through a line D joining the effective ground contact points of the tyres of the two rear wheels, is substantially 90 degrees, that is to say, in the range from 85 to 95 degrees, and (b) the resilient telescopic strut 25 is so inclined with respect to the leg 11, when the aircraft is groundborne and stationary, that its axis C passes through the mid-point of the said line B.

With the alighting gear described, the wheels of the bogie are substantially equally loaded when the aircraft is stationary on the ground and remains substantially equally loaded when the aircraft is moving along the ground with the brakes applied.

It will be understood that the effective ground contact point of a rear wheel tyre will be determined by the allup-weight of the aircraft of which the alighting gear forms part. An alighting gear in accordance with the invention will be designed having regard to the design all-up-weight of the aircraft so that for that weight there will be little or no lifting of the rear of the bogie. For all-up-weights near to, and on either side of the design all-up-weight which are encountered in use, any lifting of the rear of the bogie will be small and not detrimental to the operation of the aircraft. This small amount of tipping may be at least partially reduced, if desired, by suitable choice of tyre inflation pressures.

I claim as my invention:

1. In an aircraft undercarriage, a landing leg which in use on the ground extends rigidly from the main body of the aircraft along a generally upright longitudinal axis, a bogie frame pivotally connected to the lower end portion of the landing leg, a pair of wheels arranged in tandem on the bogie frame for rotational contact with the ground during such use, a strut having a longitudinal axis extending intermediate the rotational axes of the wheels and pivotally connected at one of its end portions to one of said landing leg and said aircraft main body and at the other of its end portions to the bogie frame, and brake means connected with each of the wheels and including a torque resisting element on the front wheel attached to the landing leg and a torque resisting element on the rear wheel attached to the bogie frame, at least one of said landing leg and said strut having resilient means thereon providing for limited movement of the pivotal connection between the bogie frame and the respective leg or strut member parallel to the longitudinal axis of said member, and the longitudinal axis of said strut being inclined at such an angle with the longitudinal axis of the landing leg that, within the limits imposed by said resilient means during use, the effective ground contact point of the rear wheel remains on a line extending through the rotational axis of the front wheel at an angle of about 85–95 degrees with the longitudinal axis of the landing leg, said strut longitudinal axis intersecting said line substantially at the mid-point thereof between said rotational axis and said contact point so that said wheels will be substantially equally loaded at all times during such use.

2. An aircraft undercarriage according to claim 1 wherein the rotational axis of the front wheel and the axis of the pivotal connection between the landing leg and the bogie frame are the same.

3. An aircraft undercarriage according to claim 1 wherein each of the wheels is one of a pair arranged on a common rotational axis, the respective pairs being arranged in tandem.

4. In an aircraft undercarriage, a landing leg having two freely telescopic parts arranged along a common longitudinal axis, said leg in use on the ground extending from the main body of the aircraft in a generally upright disposition with the upper part thereof rigidly connected with said aircraft main body, a bogie frame pivotally connected to the lower part of the landing leg, a pair of wheels arranged in tandem on the bogie frame for rotational contact with the ground during such use, a strut having a longitudinal axis extending intermediate the rotational axes of the wheels and pivotally connected at one of its end portions to the upper part of the landing leg and at the other of its end portions to the bogie frame, and brake means connected with each of the wheels and including a torque resisting element on the front wheel attached to the lower part of the landing leg and a torque resisting element on the rear wheel attached to the bogie frame, the end portions of the strut being connected for limited relative movement along the longitudinal axis thereof and said strut longitudinal axis being inclined at such an angle with the longitudinal axis of the landing leg that, within the limits of this movement, the effective ground contact point of the rear wheel remains during use on a line extending through the rotational axis of the front wheel and at an angle of about 85–95 degrees with the longitudinal axis of the landing leg, said strut longitudinal axis intersection said line substantially at the mid-point thereof between said rotational axis and said contact point so that said wheels will be substantially equally loaded at all times during such use.

References Cited in the file of this patent

UNITED STATES PATENTS 2,792,998     Dowty _____ May 21, 1957